(12) United States Patent
Jin et al.

(10) Patent No.: US 8,854,752 B2
(45) Date of Patent: Oct. 7, 2014

(54) SYSTEMS AND METHODS FOR TRACK WIDTH DETERMINATION

(75) Inventors: Ming Jin, Fremont, CA (US); Haitao Xia, San Jose, CA (US)

(73) Assignee: LSI Corporation, San Jose, CA (US)

(*) Notice: Subject to any disclaimer, the term of this patent is extended or adjusted under 35 U.S.C. 154(b) by 460 days.

(21) Appl. No.: 13/100,063

(22) Filed: May 3, 2011

(65) Prior Publication Data
US 2012/0281304 A1    Nov. 8, 2012

(51) Int. Cl.
G11B 27/36    (2006.01)
G11B 19/04    (2006.01)
G11B 20/22    (2006.01)

(52) U.S. Cl.
CPC ........ *G11B 27/36* (2013.01); *G11B 2220/2516* (2013.01); *G11B 19/045* (2013.01); *G11B 20/22* (2013.01)
USPC .......................................................... 360/31

(58) Field of Classification Search
None
See application file for complete search history.

(56) References Cited

U.S. PATENT DOCUMENTS

| | | | |
|---|---|---|---|
| 4,991,026 A * | 2/1991 | Takase et al. | 386/201 |
| 5,262,904 A | 11/1993 | Tang et al. | |
| 5,357,520 A | 10/1994 | Arnett et al. | |
| 5,493,454 A | 2/1996 | Ziperovich et al. | |
| 5,517,146 A | 5/1996 | Yamasaki | |
| 5,583,705 A | 12/1996 | Ziperovich et al. | |
| 5,781,358 A | 7/1998 | Hasegawa | |
| 5,872,664 A | 2/1999 | Meier | |
| 5,986,830 A | 11/1999 | Hein | |
| 5,999,355 A | 12/1999 | Behrens et al. | |
| 6,043,942 A | 3/2000 | Cunningham et al. | |
| 6,091,560 A | 7/2000 | Du | |
| 6,130,794 A | 10/2000 | Christensen | |
| 6,134,691 A | 10/2000 | Hirasaka | |
| 6,141,168 A | 10/2000 | Takahashi et al. | |
| 6,147,828 A | 11/2000 | Bloodworth et al. | |
| 6,181,505 B1 | 1/2001 | Sacks et al. | |
| 6,208,477 B1 | 3/2001 | Cloke et al. | |
| 6,208,481 B1 | 3/2001 | Spurbeck et al. | |
| 6,212,024 B1 | 4/2001 | Igarashi et al. | |
| 6,243,031 B1 | 6/2001 | Jusuf et al. | |

(Continued)

FOREIGN PATENT DOCUMENTS

| | | |
|---|---|---|
| DE | 10127447 | 10/2002 |
| GB | 2 320 866 9723484.3 | 6/1997 |
| JP | 53105123 A * | 9/1978 |

OTHER PUBLICATIONS

U.S. Appl. No. 12/199,325, filed Aug. 27, 2008, Mathew.

(Continued)

*Primary Examiner* — Daniell L Negron
(74) *Attorney, Agent, or Firm* — Hamilton DeSanctis & Cha (57) ABSTRACT

Various embodiments of the present invention provide systems and methods for read sensor characterization. As an example, a data storage device is disclosed that includes a storage medium, a read/write head assembly disposed in relation to the storage medium, and a track width setting circuit. The track width setting circuit is operable to: write data to at least a first track and a second track on the storage medium, read data from the second track, determine an estimated track offset where interference from the data written to the first track is insubstantial, and modify at least the second track width based at least in part on the estimated track offset. The first track is a first track width and the second track is a second track width.

20 Claims, 6 Drawing Sheets

(56) References Cited

U.S. PATENT DOCUMENTS

| | | | |
|---|---|---|---|
| 6,246,723 B1 | 6/2001 | Bliss et al. | |
| 6,337,778 B1 | 1/2002 | Gagne | |
| 6,396,651 B1 | 5/2002 | Grover | |
| 6,404,572 B1 | 6/2002 | Hong | |
| 6,535,345 B1 | 3/2003 | Shimoba | |
| 6,563,655 B1 | 5/2003 | Yamasaki et al. | |
| 6,621,648 B2 | 9/2003 | Elliott et al. | |
| 6,661,627 B1 * | 12/2003 | Kadokawa | 360/327.3 |
| 6,662,303 B1 | 12/2003 | Toosky et al. | |
| 6,671,244 B2 | 12/2003 | Honma | |
| 6,674,590 B2 | 1/2004 | Ottesen et al. | |
| 6,678,230 B2 | 1/2004 | Miyashita et al. | |
| 6,721,114 B1 | 4/2004 | Sutardja et al. | |
| 6,788,481 B2 | 9/2004 | Fang et al. | |
| 6,894,854 B1 | 5/2005 | Carlson et al. | |
| 6,912,682 B1 | 6/2005 | Aoki | |
| 6,934,100 B2 | 8/2005 | Ueno | |
| 6,937,415 B2 | 8/2005 | Galbraith et al. | |
| 7,012,772 B1 | 3/2006 | Vis | |
| 7,079,342 B1 | 7/2006 | Han et al. | |
| 7,092,179 B2 | 8/2006 | Yamanouchi | |
| 7,092,180 B2 | 8/2006 | Franck | |
| 7,123,429 B2 | 10/2006 | Musungu et al. | |
| 7,126,773 B1 | 10/2006 | Taratorin | |
| 7,139,143 B2 | 11/2006 | Tsunoda et al. | |
| 7,170,700 B1 * | 1/2007 | Lin et al. | 360/31 |
| 7,170,704 B2 | 1/2007 | DeGroat et al. | |
| 7,193,802 B2 | 3/2007 | Cideciyan et al. | |
| 7,248,424 B2 | 7/2007 | Ueno | |
| 7,256,954 B2 | 8/2007 | Serizawa et al. | |
| 7,262,928 B1 | 8/2007 | Oberg | |
| 7,271,753 B1 | 9/2007 | Padukone et al. | |
| 7,283,316 B2 * | 10/2007 | Chiao et al. | 360/48 |
| 7,308,057 B1 | 12/2007 | Patapoutian | |
| 7,426,236 B1 | 9/2008 | He | |
| 7,440,224 B2 | 10/2008 | Ehrlich et al. | |
| 7,495,854 B2 | 2/2009 | Hutchins | |
| 7,542,227 B2 | 6/2009 | Che et al. | |
| 7,696,838 B2 | 4/2010 | Wada | |
| 7,715,135 B1 | 5/2010 | Sutardja et al. | |
| 7,733,591 B2 | 6/2010 | Bottemiller et al. | |
| 8,467,142 B2 * | 6/2013 | Sakai et al. | 360/48 |
| 2003/0026354 A1 | 2/2003 | Chang et al. | |
| 2005/0117243 A1 | 6/2005 | Serizawa et al. | |
| 2005/0169415 A1 | 8/2005 | Nayak et al. | |
| 2006/0061496 A1 | 3/2006 | Stein et al. | |
| 2006/0062125 A1 | 3/2006 | Horie et al. | |
| 2006/0176947 A1 | 8/2006 | Lim | |
| 2006/0232871 A1 | 10/2006 | Brittenham | |
| 2007/0041115 A1 | 2/2007 | Lee | |
| 2007/0047120 A1 | 3/2007 | DeGroat | |
| 2007/0064836 A1 | 3/2007 | Byrne et al. | |
| 2007/0076313 A1 | 4/2007 | Hutchins et al. | |
| 2007/0140088 A1 | 6/2007 | Hino et al. | |
| 2007/0236270 A1 | 10/2007 | Chiang et al. | |
| 2007/0260623 A1 | 11/2007 | Jaquette et al. | |
| 2008/0031114 A1 | 2/2008 | Hong et al. | |
| 2008/0032652 A1 | 2/2008 | Zhao et al. | |
| 2008/0037153 A1 | 2/2008 | Yoshizawa | |
| 2008/0081382 A1 | 4/2008 | Yang et al. | |
| 2009/0033680 A1 | 2/2009 | Ratnakar Aravind | |
| 2009/0161245 A1 | 6/2009 | Mathew | |
| 2009/0230639 A1 | 9/2009 | Van Cayzeele | |

OTHER PUBLICATIONS

U.S. Appl. No. 12/273,265, filed Nov. 18, 2008, Mathew.
U.S. Appl. No. 12/337,775, filed Dec. 18, 2008, Mathew.
U.S. Appl. No. 12/337,805, filed Dec. 18, 2008, Mueller.
U.S. Appl. No. 12/337,828, filed Dec. 18, 2008, Mueller.
U.S. Appl. No. 12/337,850, filed Dec. 18, 2008, Mueller.
U.S. Appl. No. 12/348,236, filed Jan. 2, 2009, Liu.
U.S. Appl. No. 12/371,906, filed Feb. 16, 2009, Ratnakar Aravind.
U.S. Appl. No. 12/430,948, filed Apr. 28, 2009, Grundvig.
U.S. Appl. No. 12/247,378, filed Apr. 8, 2010, Mathew.
U.S. Appl. No. 12/463,626, filed May 11, 2009, Mathew.
U.S. Appl. No. 12/510,222, filed Jul. 27, 2009, Ratnakar Aravind.
U.S. Appl. No. 12/558,928, filed Sep. 14, 2009, Mahtew.
U.S. Appl. No. 12/663,325, filed Apr. 20, 2010, Mahtew.
U.S. Appl. No. 12/652,201, filed Jan. 5, 2010, Mahtew.
U.S. Appl. No. 13/100,063, filed May 3, 2011, Jin, Ming et.al.
U.S. Appl. No. 13/180,311, filed Jul. 11, 2011, Tan, Weijun et.al.
Cho and Lee, "An Estimation Technique for Nonlinear Distortion in High Density Magnetic Recording Channels", IEEE Transactions on Magnetics, vol. 34, No. 1, pp. 40-44 Jan. 1998.
Barry J. et al "Iterative Timing Recovery" IEEE Signal Processing Magazine vol. 21, No. 1, Jan. 1, 2004.
DeGroat et al., "Experimental Characterization of Media Noise Based on Equalized Synchronized Drive Data", IEEE Trans. Magnetics, vol. 37, No. 2, pp. 633-638, Mar. 2001.
Farhang-Boroujeny, Adaptive Filters: Theory and Applications. John Wiley & Sons Ltd, 1998, Chapter 11. pp. 373-379.
Kavcic and Patapoutian, "A Signal-Dependent Autoregressive Channel Model", IEEE Trans. Magnetics, vol. 35 No. 5, pp. 2316-2318, Sep. 1999.
Lin et al. "An estimation technique for accurately modelling the magnetic recording channel including nonlinearities." IEEE Trans. Mag, vol. 25, No. 5, pp. 4084-4086, Sep. 1989.
Moon, J., "Signal-to-Noise Ratio Definition for Magnetic Recording Channels With Transition Noise", IEEE Trans. Magnetics, vol. 36, No. 5, pp. 3881-3883, Sep. 2000.
Palmer et al, "Identification of nonlinear write effects using pseudorandom sequences" IEEE Trans. Magnetics, vol. 23 No. 5, pp. 2377-2379, Sep. 1987.
Partovi; et al., "Flow-Through Latch and Edge-Triggered Flip-Flop Hybrid Elements"; Feb. 8, 1996; pp. 138-139; Solid-State Circuits Conf Digest of Technical Papers IEEE.
Tokumasu et al. "A New Reduced Clock-Swing Flip-Flop (NDKFF)," Corporate Research & Development Center, Toshiba Corporation. IEEE Feb. 2002 Custom Integrated Circuits Conf.
Wood and Donaldson, "The Helical-Scan Magnetic Tape Recorder as a Digital Communication Channel", IEEE Transactions on Magnetics, vol. MAG-15, No. 2, pp. 935-943 Mar. 1979.

* cited by examiner

SYSTEMS AND METHODS FOR TRACK WIDTH DETERMINATION

BACKGROUND OF THE INVENTION

The present inventions are related to systems and methods sensing data, and more particularly to systems and methods for characterizing a data sensor.

Data storage devices often include a read head that senses information stored on a storage medium. The data is often arranged in tracks of a particular width. As the sensing characteristics of the read head change, there is a possibility to sense data from tracks on either side of the track being read and/or to unduly limit the width of the tracks established on a storage medium. Existing approaches for characterizing such sensors have been signal amplitude based methods and/or variable gain amplifier based methods. Such methods, however, are not as accurate as the width of data tracks is decreased resulting in smaller signal to noise ratios.

Hence, for at least the aforementioned reasons, there exists a need in the art for advanced systems and methods for characterizing data sensors.

BRIEF SUMMARY OF THE INVENTION

The present inventions are related to systems and methods sensing data, and more particularly to systems and methods for characterizing a data sensor.

Various embodiments of the present invention provide data storage devices that include: a storage medium, a read/write head assembly disposed in relation to the storage medium, and a track width setting circuit. The track width setting circuit is operable to: write data to at least a first track and a second track on the storage medium, read data from the second track, determine an estimated track offset where interference from the data written to the first track is insubstantial, and modify at least the second track width based at least in part on the estimated track offset. The first track is a first track width and the second track is a second track width. In some cases, the first track width and the second track width are the same. In other cases, the first track width is different from the second track width.

In some instances of the aforementioned embodiments, determining the estimated track offset where interference from the data written to the first track is insubstantial includes: comparing a value read from the target track to a threshold value to yield a comparison value; and indicating the interference from the data written to the first track is insubstantial based on the comparison value. In other instances of the aforementioned embodiments, determining the estimated track offset where interference from the data written to the first track is insubstantial includes: reading the target track at a first adjusted track offset to yield a first value, and reading the target track at a second adjusted track offset to yield a second value. The first adjusted track offset is closer to the first track than the second adjusted track offset. The instance further includes comparing the first value to a threshold value to yield a first comparison value. The first comparison value indicates that the interference from the data written to the first track is not insubstantial. The instance further includes comparing the second value to the threshold value to yield a second comparison value. The second comparison value indicates that the interference from the data written to the first track is insubstantial. In some such instances, the estimated track offset is the second adjusted track offset.

In other instances of the aforementioned embodiments, the estimated track offset is a first estimated track offset, and the track width setting circuit is further operable to write data to a third track on the storage medium. The third track is adjacent the second track and separated from the first track by the second track. The track width setting circuit is further operable to: determine a second estimated track offset where interference from the data written to the third track is insubstantial; and modify at least the second track width based at least in part on a distance between the first estimated track offset and the second estimated track offset.

Other embodiments of the present invention provide methods for determining a track width corresponding to a read sensor. Such methods include writing data to at least a first track, a second track, and a third track on a storage medium. The second track exhibits a track width, and the third track is adjacent the second track and separated from the first track by the second track. The methods further include: reading data from the second track; determining a first estimated track offset where interference from the data written to the first track is insubstantial; determining a second estimated track offset where interference from the data written to the third track is insubstantial; calculating a distance between the first estimated track offset and the second estimated track offset; and modifying the track width based at least in part on a distance between the first estimated track offset and the second estimated track offset.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods sensing data, and more particularly to systems and methods for characterizing a data sensor.

Figure 1A:
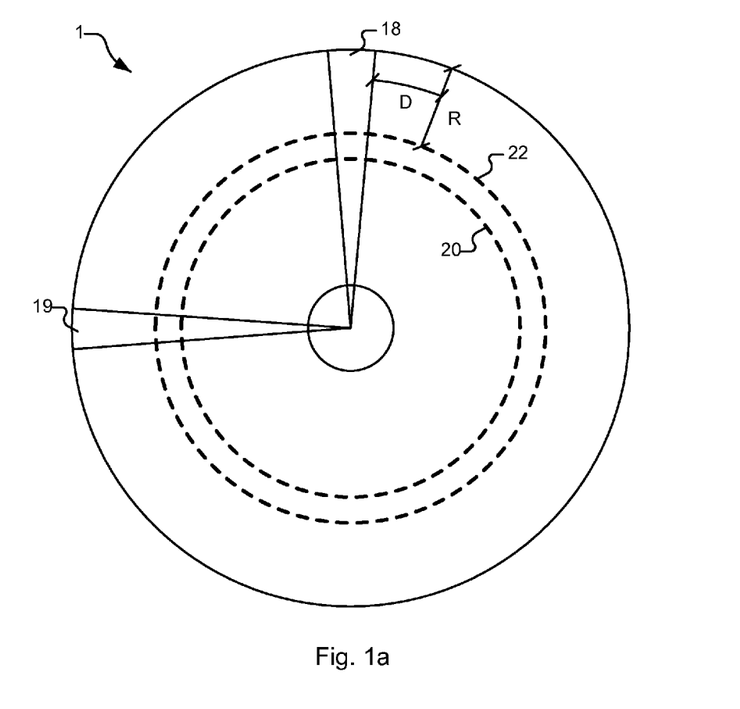
FIGS. 1a-1b are block diagrams of a known magnetic storage medium and track storage scheme.
Figure 1B:
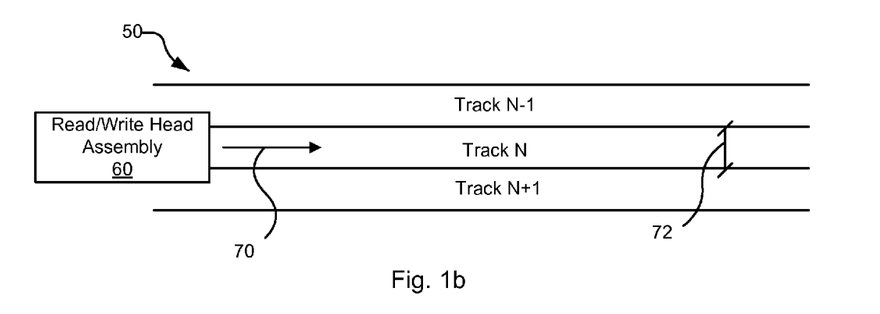

Turning to FIG. 1, a storage medium 1 is shown with two example tracks 20, 22 indicated as dashed lines. The tracks are segregated by servo data written within wedges 19, 18. These wedges include servo data that are used for control and synchronization of a read/write head assembly over a desired location on storage medium 1. User data is stored in the regions between the wedges. It should be noted that while two tracks and two wedges are shown, hundreds of each would typically be included on a given storage medium. FIG. 1b shows three adjacent tracks (Track N−1, Track N, and Track N+1) with a read/write head assembly 60 flying in a direction 70 over Track N. Of note, where the sense width of read/write head assembly 60 is greater than the width of Track N (i.e., the perpendicular distance 72 between the nearest edges of Track N−1 and Track N+1), read/write head assembly 60 will sense the data written to either or both of Track N−1 and Track N+1 in addition to the data written to Track N. Conversely, where the width of Track N is very wide, a properly located read/write head assembly 60 will not sense substantially sense the data written to either or both of Track N−1 and Track N+1. Various embodiments of the present invention are tailored to properly define the width of the tracks to optimize track width to increase storage density (i.e., decreasing width) in balance with minimizing interference with adjacent tracks (i.e., increasing width).

Figure 2:
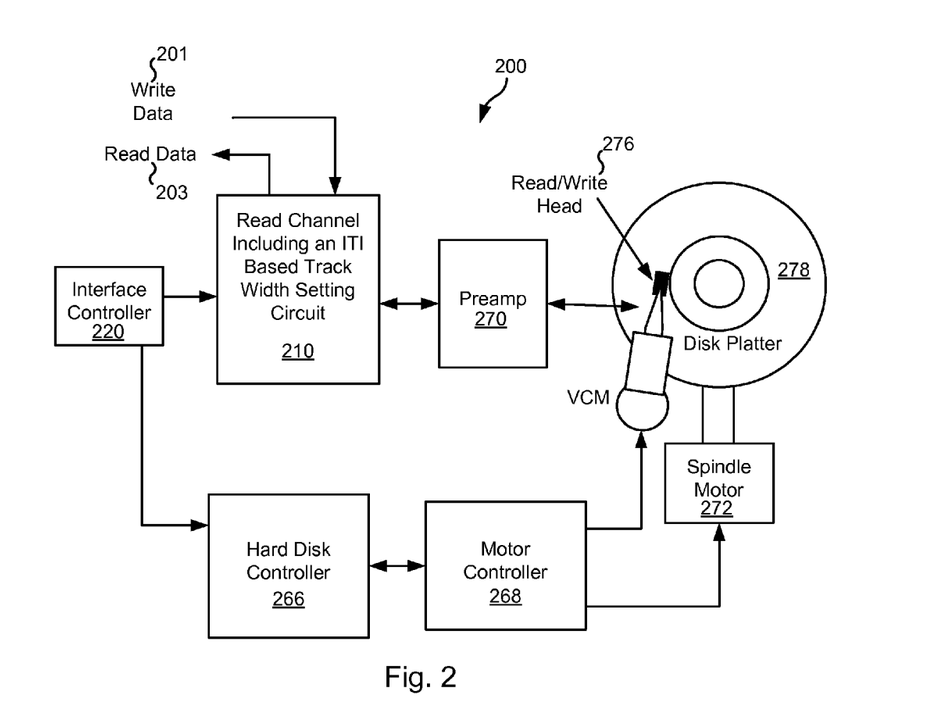
FIG. 2 shows a storage system including a read channel circuit with an inter-track interference based track width setting circuit in accordance with some embodiments of the present invention.

Turning to FIG. 2, a storage system 200 including a read channel circuit 210 with an inter-track interference based track width setting circuit is shown in accordance with some embodiments of the present invention. Storage system 200 may be, for example, a hard disk drive. Storage system 200 also includes a preamplifier 270, an interface controller 220, a hard disk controller 266, a motor controller 268, a spindle motor 272, a disk platter 278, and a read/write head assembly 276. Interface controller 220 controls addressing and timing of data to/from disk platter 278. The data on disk platter 278 consists of groups of magnetic signals that may be detected by read/write head assembly 276 when the assembly is properly positioned over disk platter 278. In one embodiment, disk platter 278 includes magnetic signals recorded in accordance with either a longitudinal or a perpendicular recording scheme.

In a typical read operation, read/write head assembly 276 is accurately positioned by motor controller 268 over a desired data track on disk platter 278. The desired track is identified in part using the enhanced servo data processing circuit. Motor controller 268 both positions read/write head assembly 276 in relation to disk platter 278 and drives spindle motor 272 by moving read/write head assembly to the proper data track on disk platter 278 under the direction of hard disk controller 266. Spindle motor 272 spins disk platter 278 at a determined spin rate (RPMs). Once read/write head assembly 276 is positioned adjacent the proper data track, magnetic signals representing data on disk platter 278 are sensed by read/write head assembly 276 as disk platter 278 is rotated by spindle motor 272. The sensed magnetic signals are provided as a continuous, minute analog signal representative of the magnetic data on disk platter 278. This minute analog signal is transferred from read/write head assembly 276 to read channel module 264 via preamplifier 270. Preamplifier 270 is operable to amplify the minute analog signals accessed from disk platter 278. In turn, read channel circuit 210 decodes and digitizes the received analog signal to recreate the information originally written to disk platter 278. This data is provided as read data 203 to a receiving circuit. A write operation is substantially the opposite of the preceding read operation with write data 201 being provided to read channel circuit 210. This data is then encoded and written to disk platter 278.

The width of the tracks being written and read by read/write head assembly 276 is variable, and may be varied based upon an amount of inter-track interference sensed by read/write head assembly 276. The amount of interference is determined by and the track width modified by the inter-track interference based track width setting circuit included as part of read channel circuit 210. The inter-track interference based track width setting circuit may be implemented similar to that described below in relation to FIG. 4 and/or using the approach discussed below in relation to FIG. 6.

It should be noted that storage system 200 may be integrated into a larger storage system such as, for example, a RAID (redundant array of inexpensive disks or redundant array of independent disks) based storage system. It should also be noted that various functions or blocks of storage system 200 may be implemented in either software or firmware, while other functions or blocks are implemented in hardware.

Figure 3:
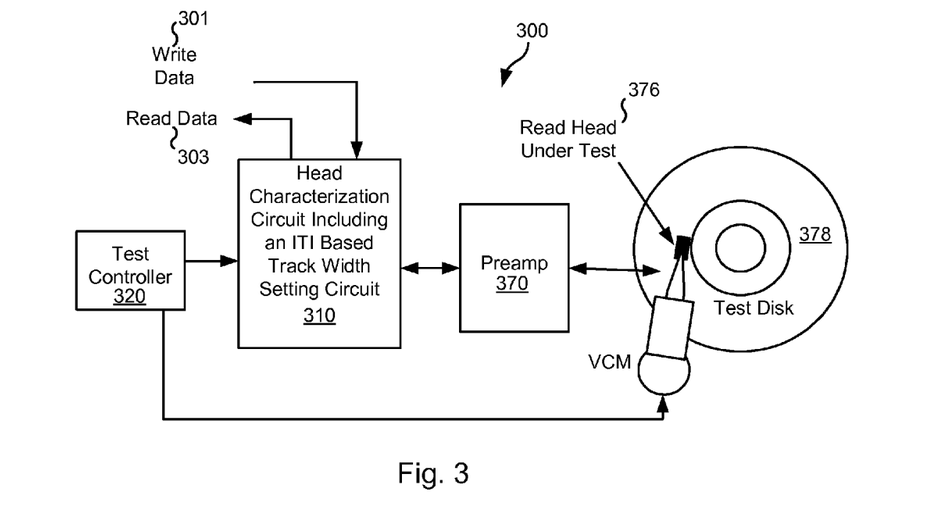
FIG. 3 shows a read head characterization test station including a head characterization circuit with an inter-track interference based track width setting circuit in accordance with some embodiments of the present invention.

Turning to FIG. 3, a read head characterization test station 300 including a head characterization circuit with an inter-track interference based track width setting circuit is shown in accordance with some embodiments of the present invention. Test station 300 also includes a preamplifier 370, an test controller 320, a test disk 378, and a read head under test 376. Test controller 320 controls the width of tracks written to test disk 378, the spin of test disk 378 relative to read head 376, and the location of read head 376 relative to test disk 378.

In operation, data is written to tracks on test disk 378 that exhibit a width controlled by test controller 320 (i.e., test controller 32 controls the radial location of read head 376 during writes to test disk 378). Test controller 320 then positions read head 376 over a track to be read. The data on test disk 378 consists of groups of magnetic signals that may be detected by read head 376 when the assembly is properly positioned over disk platter 378. As test disk 378 is spun relative to read head 376, read head 376 senses the data and transfers minute analog signals representative of the data to head characterization circuit 310 via preamplifier circuit 370. Preamplifier 270 is operable to amplify the minute analog signals accessed from test disk 378. In turn, head characterization circuit 310 determines an amount of interference caused by tracks adjacent to that being read. This process is repeated for different track widths under the control of test controller 320 until a read width of read head 376 is established. This read width is provided as a characteristic of read head 376. The amount of interference is determined by and guidance on modifying the track width is provided the inter-track interference based track width setting circuit included as part of head characterization circuit 310. The inter-track interference based track width setting circuit may be implemented similar to that described below in relation to FIG. 4 and/or using the approach discussed below in relation to FIG. 6.

Figure 4:
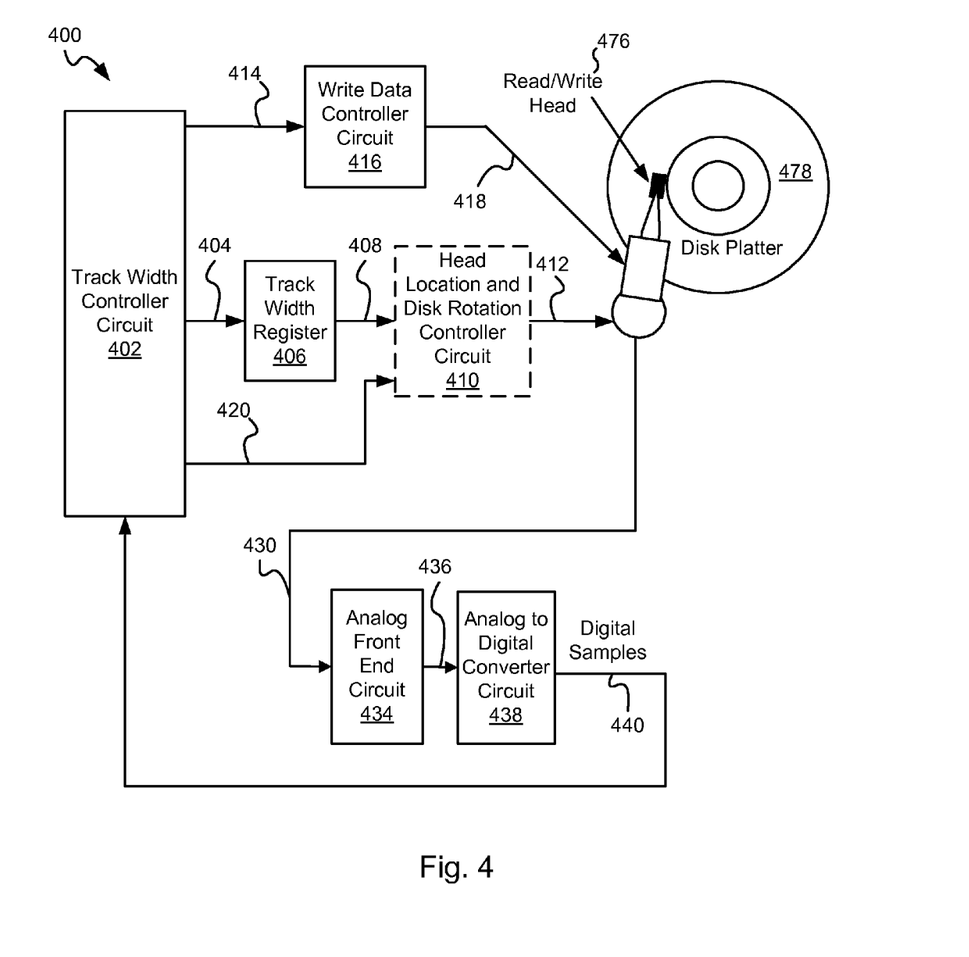
FIG. 4 depicts an inter-track interference based track width setting circuit in accordance with one or more embodiments of the present invention.

Turning to FIG. 4, an inter-track interference based track width setting circuit 400 is shown in accordance with one or more embodiments of the present invention. Setting circuit 400 includes a write data controller circuit 416 that is operable to format and write a data pattern received as data input 414 to a disk platter 478 using a read/write head assembly 476. Write data controller circuit 416 is provided to read/write head assembly 476 as write data 418. Write data controller circuit 416 may be any circuit known in the art that is capable of formatting a data set to be provided to a read/write head assembly for writing to a storage medium.

In addition, setting circuit 400 includes a track width register 406 that stores a track width input 404, and provides the stored track width as a track width output 408 to a head location and disk rotation controller circuit 410. Head location and disk rotation controller circuit 410 is shown in dashed lines as it may include a number of elements including, but not limited to, a hard disk controller, a motor controller, and/or a spindle motor similar to those discussed above in relation to FIG. 2. Head location and disk rotation controller circuit 410 is operable to position read/write head assembly 476 relative to disk platter 478 and to control the rotation of disk platter 478 relative to read/write head assembly 476 using a control output 412.

In controlling the position of read/write head assembly 476 relative to disk platter 478, read/write head assembly 476 is positioned a distance away from a previous track that corresponds to track width output 408. In addition, head location and disk rotation controller circuit 410 receives a head offset control value 420 that controls an offset from an expected track centerline. In particular, in positioning read/write head assembly 476 relative to disk platter 478, head location and disk rotation controller circuit 410 adjusts the location of read/write head assembly 476 a positive or negative offset from the location set by track width output 408.

Setting circuit 400 also includes an analog front end circuit 434 that receives an analog signal 430 from read/write head assembly 476 during read operations, and provides a corresponding analog output signal 436. Analog front end circuit 434 may include any circuitry known in the art that is capable of receiving an analog input signal and providing a modified analog signal as an output. In one particular instance, analog front end circuit 434 includes an amplifier (not shown) that receives and amplifies analog input signal 430 and an analog filter (not shown) that reduces any noise exhibited at the output of the amplifier. Based upon the disclosure provided herein, one of ordinary skill in the art will recognize a variety of circuitry that may be included in analog front end circuit 434 in accordance with different embodiments of the present invention.

Analog output signal 436 is provided to an analog to digital converter circuit 438. Analog to digital converter circuit 438 provides a series of digital samples 440 representing analog output signal 436. Digital samples 440 are synchronized to a sample clock (not shown) that is provided to analog to digital converter circuit 438. Analog to digital converter circuit 438 may be any circuit or system known in the art that is capable of converting a continuous signal into a series of digital samples. Analog input signal 436 is a continuous signal representing a number of bit periods. The bit periods recur with a periodicity of T, and the sample clock causes analog to digital converter circuit 438 to generate a number of samples of analog input signal 430 for each period T. In one particular embodiment of the present invention, four samples are generated for each period T. In another embodiment of the present invention, eight samples are generated for each period T. It should be noted that other numbers of samples per period may be generated. Based upon the disclosure provided herein, one of ordinary skill in the art will recognize a variety of sampling frequencies and corresponding bit periods that may be used in relation to different embodiments of the present invention.

Digital samples 440 are provided to a track width controller circuit 402, and track width controller circuit 402 provides track width input 404 to track width register 406, and data input 414 to write controller circuit 416. Track width controller circuit 402 is operable to perform a stepwise approach to determining a track width on disk platter 478 that optimizes the operation of the read element included in read/write head assembly 476. In particular, track width controller circuit 402 sets an initial track width by writing a value corresponding to the initial track width to track width register 406. Once head location and disk rotation controller circuit 410 causes read/write head assembly 476 to position over an adjacent track of a track width corresponding to track width output 408, track location controller circuit 402 provides an adjacent data pattern as data input 414 to write data controller circuit 416 that in turn causes a signal corresponding to data input 414 to be stored to disk platter 478 via read/write head assembly 476. As used herein, the phrase "adjacent track" is used in its broadest sense to mean a location on a storage medium that is adjacent to another location that will be the target of a read (i.e., a target track"). As an example, Track N−1 and Track N+1 of FIG. 1b are respectively adjacent tracks. As used herein, the phrase "target track" is a location on a storage medium that is the target of a read operation. As an example, Track N of FIG. 1b is a target track as read/write head assembly 60 is positioned to interact with Track N. Of note, a given track may in one instance be a "target track" when it is being read, and in another instance be an "adjacent track" when a track adjacent to the given track is being read.

Head location and disk rotation controller circuit 410 additionally causes read/write head assembly 476 to position over a target track next to the previously discussed adjacent track and also having a track width corresponding to track width output 408, track location controller circuit 402 provides a target data pattern as data input 414 to write data controller circuit 416 that in turn causes a signal corresponding to data input 414 to be stored to disk platter 478 via read/write head assembly 476. As used herein, the phrases "target data pattern" and "adjacent data pattern" are used in their broadest senses to mean any data pattern distinguishable from the other (i.e., a target data pattern is any data pattern that is distinguishable from an adjacent data pattern, and vice versa). Thus, for example, an adjacent data pattern may be a series of data that causes relatively high values to be written to disk platter 478 and a corresponding target data pattern may be a series of data that causes relatively low values to be written to disk platter 478. Based upon the disclosure provided herein, one of ordinary skill in the art will recognize a variety of possible target and adjacent data patterns that may be used in relation to different embodiments of the present invention. In addition, head location and disk rotation controller circuit 410 causes read/write head assembly 476 to position over another adjacent track next to the previously discussed target track and also having a track width corresponding to track width output 408. Once positioned, track location controller circuit 402 provides an adjacent data pattern as data input 414 to write data controller circuit 416 that in turn causes a signal corresponding to data input 414 to be stored to disk platter 478 via read/write head assembly 476.

After the aforementioned writes, track width controller circuit 402 causes write controller circuit 410 to position read/write head assembly 476 over the target track with an offset from the centerline of the target track defined by an initial offset value provided by track width controller circuit 402 as head offset control value 420. In some cases, the initial offset is set to make interference from one of the adjacent tracks likely (i.e., read/write head assembly 476 is positioned far enough from the center line of the target track such that it senses both the target track and the adjacent track on the side of the target track corresponding to the offset). Once positioned, read/write head assembly 476 senses the previously stored target data and provides the sensed information as analog signal 430. In turn, digital samples 440 corresponding to analog signal 430 are provided to track width control circuit 402. Track width control circuit analyzes digital samples 403 to determine if there is any impact from the adjacent track on the side of target track corresponding to the offset.

On the initial pass, it is likely that interference from the adjacent track occurs. Where this is the case, the offset value provided by track width controller circuit 402 as head offset control value 420 is adjusted such that read/write head assembly 476 moves stepwise away from the adjacent track from which the interference is sensed. This stepwise process is continued until the interference from the adjacent track drops below a threshold level. The threshold level may be programmable. The offset corresponding to the step where the interference the adjacent track drops below a threshold level is identified as a first non-interference point. The stepwise process of adjusting the offset value provided by track width controller circuit 402 as head offset control value 420 is continued until interference from the adjacent track on the opposite side of the target track exceeds the threshold level. The offset corresponding to this step preceding the step where the interference is detected is identified as a second non-interference point. As used herein, the phrase "non-interference point" is used in its broadest sense to mean a point where interference from an adjacent track is less than or equal to a given level or percentage.

Figure 5A:
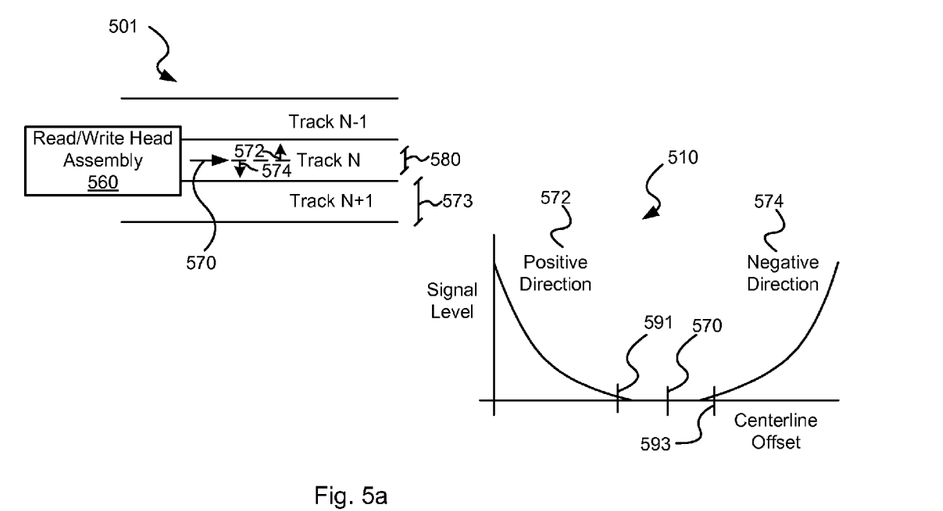
FIGS. 5a-5c depict example interim outputs relative to track width settings in accordance with some embodiments of the present invention.

The previously described case is graphically depicted in FIG. 5a where a read/write head assembly 560 is shown in relation to a target track (Track N), and two adjacent tracks (Track N−1 and Track N+1). Each of the tracks are set to have a width 573 that may be set by track width controller circuit 402 by writing track width register 406. Read/write head assembly has a read width 580. Read/write head assembly may be offset in both a positive direction 572 and a negative direction 574 from a centerline 570 of the target track under the control of track width controller circuit 402 via head offset control value 420. A graph 510 shows the change in signal level (i.e., digital samples 440) as head offset control value 420 is varied from an extreme positive direction 572 from centerline 570 to an extreme negative direction 574 from centerline 570. During this stepwise transition the signal level drops below a threshold level at a first non-interference point 591, and again exceeds the threshold level at a second non-interference point 593. The first and second non-interference points may be on either side of centerline 570. In this case, the distance between first non-interference point 591 and second non-interference point 593 is significant suggesting that the width of the tracks may be decreased for this particular read/write head assembly. Of note, graph 510 suggest that the values written to the adjacent tracks are high relative to the values written to the target track. The reverse is also possible where the values written to the adjacent tracks is relatively low compared with those written to the target track. Such a case can be accommodated by changing the threshold level and detecting a greater than condition rather than a less than condition. It should be noted that one of the adjacent tracks may be relatively higher than the target track, and the other adjacent track may be relatively lower than the target track with a corresponding change in threshold levels and logic.

Returning to FIG. 4, track width controller circuit 402 calculates the distance between the first non-interference and the second non-interference point. This distance is then compared with an acceptable range. Where the distance is too small there is an undue interference from adjacent tracks for a given read/write head assembly. In contrast, where the distance is too large the density of storage supported by the given read/write head assembly is less than possible. Where the distance is too small, track width controller circuit 402 increases the width of the tracks by modifying the track width value maintained in track width register 406, and repeats the process of writing the adjacent and target tracks followed by the previously described stepwise read of the target track. Otherwise, where the distance is too large, track width controller circuit 402 decreases the width of the tracks by modifying the track width value maintained in track width register 406, and repeats the process of writing the adjacent and target tracks followed by the previously described stepwise read of the target track. This process is repeated until an acceptable track width is identified. Once identified, the track width maintained in track width register 406 is used for operation in the case where setting circuit 400 is implemented as part of a storage device, or the track width maintained in track width register 406 is used to characterize read/write head assembly 476 where setting circuit 400 is implemented as part of a test or characterization stand.

Figure 5B:
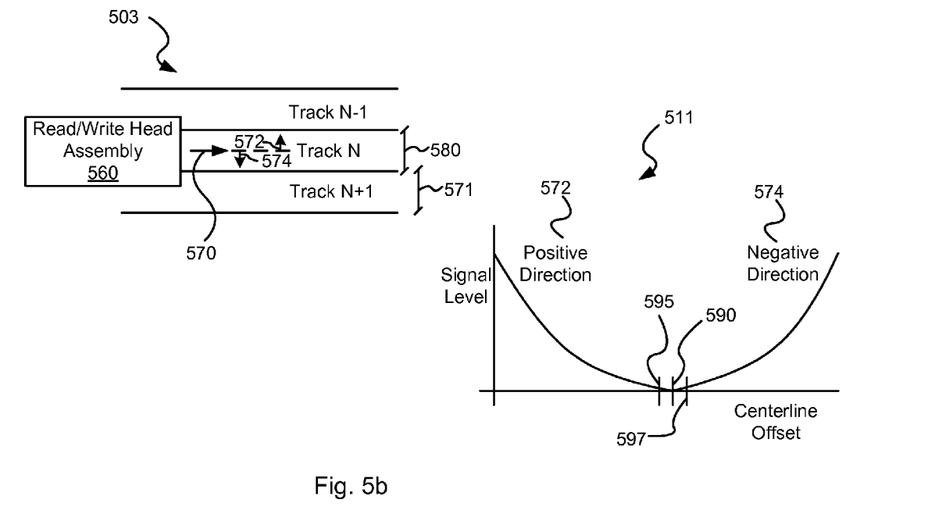
Figure 5C:
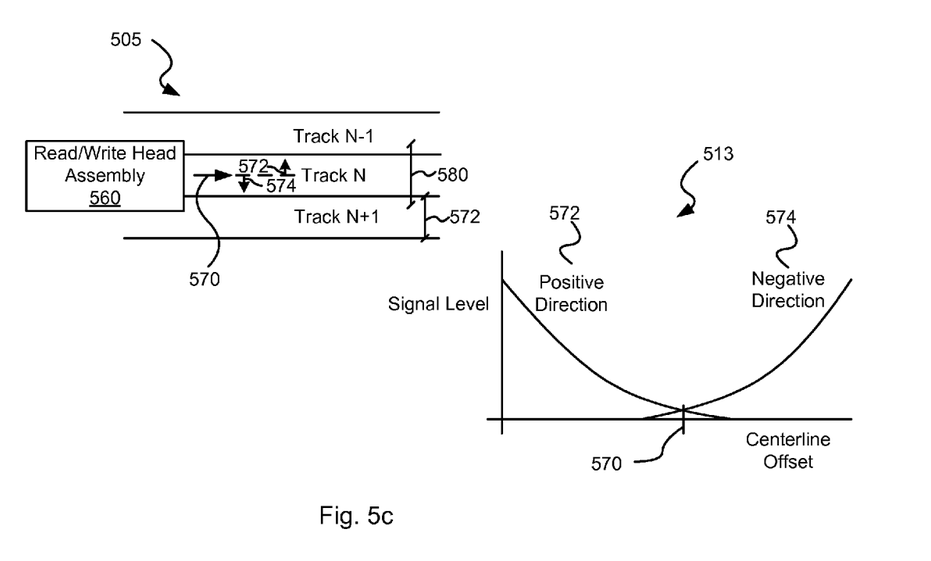

FIG. 5b shows an example situation where the distance between non-interference points is acceptable. In this case shown as a graph 511, the tracks have a width of 571 resulting in a first non-interference point 595 nearer to a second non-interference point 597 than what occurred in graph 510. FIG. 5c shows an example situation where the distance between non-interference points is too small (i.e., less than zero). In this case shown as a graph 513, the tracks have a width of 572 resulting in an inability to detect non-interference point. In particular, the non-interference points are not detected because the interference from one adjacent track is not sufficiently attenuated before the interference from the opposite adjacent track begins to increase.

Figure 6:
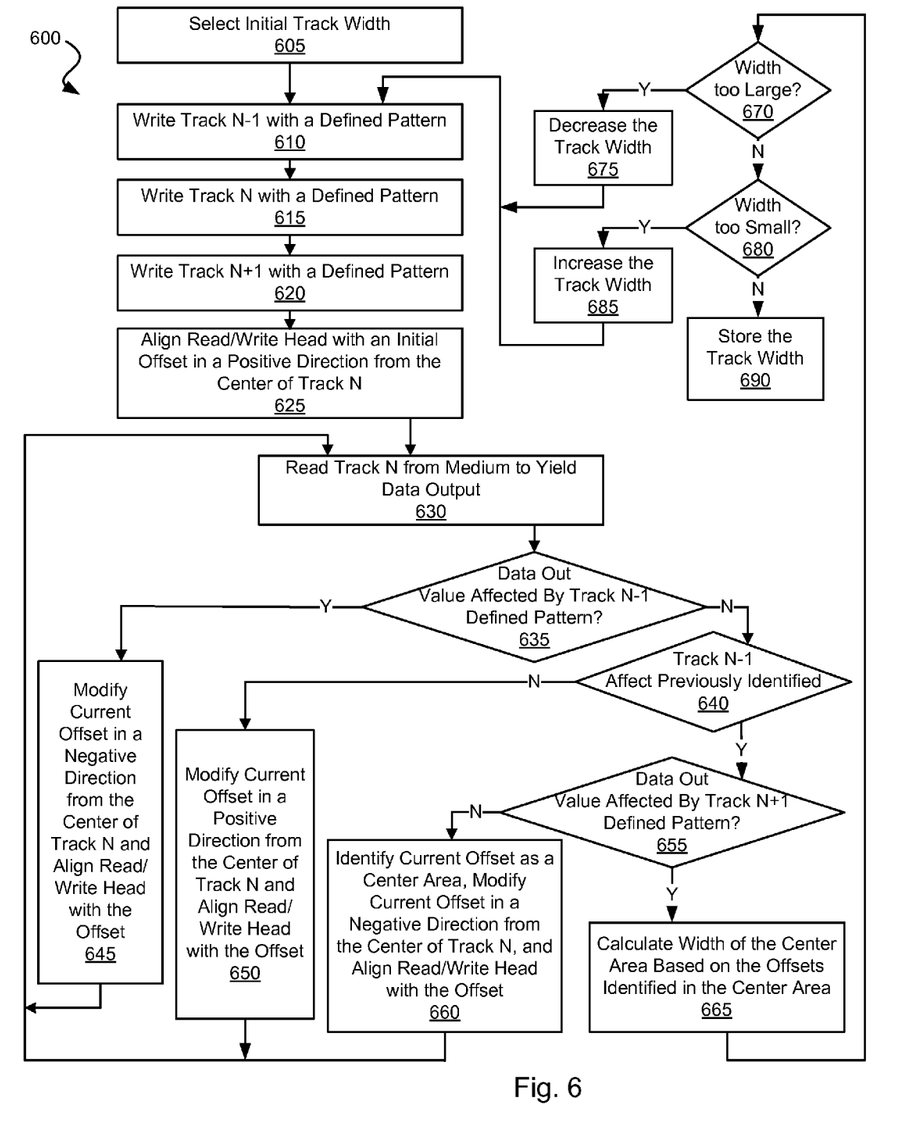
FIG. 6 is a flow diagram of a method in accordance with some embodiments of the present invention for track width setting.

Turning to FIG. 6, a flow diagram 600 depicts a method in accordance with some embodiments of the present invention for track width setting. Following flow diagram 600, an initial track width is selected (block 605). This may be done, for example, by writing an initial track width to a track width register. An adjacent track (Track N−1) is then written with a defined pattern (block 610). In some cases, the defined pattern is an adjacent pattern as described above. A target track (Track N) is written with a defined pattern (block 615). In some cases, the defined pattern is a target pattern as described above. Another adjacent track (Track N+1) is also written with a defined pattern (block 620). In some cases, the defined pattern is an adjacent pattern as described above.

The read/write head assembly is positioned over the target track (Track N) with an initial offset in a positive direction from the center of the target track (block 625). Such positioning may be done in part by providing an initial offset to a write controller circuit. In some cases, the initial offset is selected to be sufficient to assure interference from one of the adjacent tracks (e.g., Track N−1). Data is then read from the target track by passing the read/write head assembly over the track as the selected offset to yield a data output (block 630). It is determined whether the data output is affected by the defined pattern maintained in the adjacent track (e.g., Track N−1) (block 635). This may be determined by comparing the data output with a threshold level. Where the data output is greater than the threshold level (or less then for a reversed pattern contrast), the data output may be considered interfered with by the defined pattern in the adjacent track. Where the data output is affected by the adjacent track (block 635), the offset is modified in a negative direction (decreasing the positive offset or increasing a negative offset) from the center of the target track, and the read/write head assembly is aligned with the updated offset (block 645). At this juncture, the processes of blocks 630-665 are repeated for the updated offset.

Alternatively, where the data output is not affected by the defined pattern maintained in the adjacent track (e.g., Track N−1) (block 635), it is determined whether a prior read of the target track at a different offset resulted in an affect by the same adjacent track (block 640). Where the target track was not previously affected by the same adjacent track (block 640), the offset is modified in a positive direction (i.e., to increase a positive offset or decrease a negative offset) from the center of the target track, and the read/write head assembly is aligned with the updated offset (block 650). At this juncture, the processes of blocks 630-665 are repeated for the updated offset. In contrast, where the target track was previously affected by the same adjacent track (block 640), it is determined whether the data output is affected by the defined pattern of the opposite adjacent track (e.g., Track N+1) (block 655). Again, this may be determined by comparing the data output with a threshold level. Where the data output is greater than the threshold level (or less then for a reversed pattern contrast), the data output may be considered interfered with by the defined pattern in the adjacent track. Where the data output is not affected by the adjacent track (block 655), the offset is identified as a center region or area (i.e., an area with limited or no interference from adjacent tracks), the offset is modified in a negative direction (decreasing the positive offset or increasing a negative offset) from the center of the target track, and the read/write head assembly is aligned with the updated offset (block 660). At this juncture, the processes of blocks 630-665 are repeated for the updated offset.

Alternatively, where the data output is affected by the adjacent track (block 655), the extent of the center area or non-interference region has been determined and a width of the center area is calculated by subtracting a point corresponding to one extreme of the center area from a point corresponding from the other extreme of the center area (block 665). At this juncture, it is determined whether the calculated width is too large (block 670). This may be done, for example, by comparing the calculated width to threshold value. A calculated width that is too large indicates a lower storage density (i.e., too wide of tracks) than can be supported by the read/write head assembly. Where the calculated width is too large (block 670), the track width is decreased (block 675). This may be done, for example, by writing a reduced value to the track width register. At this juncture, the processes of blocks 610-690 are repeated for the updated track width.

Otherwise, where the track width is not determined to be too large (block 670), it is determined whether the calculated width is too small (block 680). Again, this may be done, for example, by comparing the calculated width to threshold value. A calculated width that is too small indicates a storage density that is too great (i.e., too narrow of tracks) than can be supported by the read/write head assembly. Where the calculated width is too small (block 680), the track width is increased (block 685). This may be done, for example, by writing an increased value to the track width register. At this juncture, the processes of blocks 610-690 are repeated for the updated track width. Alternatively, where the calculated width is not too small (block 680), the calculated track width is stored (block 690). This stored track width may be used for operation of a storage device where the method is implemented in relation to a storage device, or may be used to characterize a read head where the method is implemented in relation to a test stand.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for characterizing read sensors and/or for setting track width. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data storage device, the data storage device comprising:
   a storage medium;
   a read/write head assembly disposed in relation to the storage medium;
   a track width setting circuit operable to:
      write a first data set to at least a first track and a second data set to at least a second track on the storage medium, wherein the first track is a first track width and the second track is a second track width, and wherein the first data set is an inverse of the second data set;
      read data from the second track;
      determine an estimated track offset where interference from the first data set written to the first track is insubstantial; and
      modify at least the second track width based at least in part on the estimated track offset.

2. The data storage device of claim 1, wherein the first track width and the second track width are the same.

3. The data storage device of claim 1, wherein determining the estimated track offset where interference from the first data set written to the first track is insubstantial includes:
   comparing a value read from the second track to a threshold value to yield a comparison value; and
   indicating the interference from the first data set written to the first track is insubstantial based on the comparison value.

4. The data storage device of claim 1, wherein determining the estimated track offset where interference from the first data set written to the first track is insubstantial includes:
   reading the second track at a first adjusted track offset to yield a first value;
   reading the second track at a second adjusted track offset to yield a second value, wherein the first adjusted track offset is closer to the first track than the second adjusted track offset;
   comparing the first value to a threshold value to yield a first comparison value, wherein the first comparison value indicates that the interference from the first data set written to the first track is not insubstantial; and
   comparing the second value to the threshold value to yield a second comparison value, wherein the second comparison value indicates that the interference from the first data set written to the first track is insubstantial.

5. The data storage device of claim 4, wherein the estimated track offset is the second adjusted track offset.

6. The data storage device of claim 1, wherein the estimated track offset is a first estimated track offset, wherein the track width setting circuit is further operable to:
  write a third data set to a third track on the storage medium, wherein the third track is adjacent the second track and separated from the first track by the second track;
  determine a second estimated track offset where interference from the third data set written to the third track is insubstantial; and
  modify at least the second track width based at least in part on a distance between the first estimated track offset and the second estimated track offset.

7. The data storage device of claim 6, wherein the track width setting circuit is further operable to:
  calculate the distance between the first estimated track offset and the second estimated track offset.

8. The data storage device of claim 6, wherein:
  determining the first estimated track offset where interference from the first data set written to the first track is insubstantial includes:
    reading the second track at a first adjusted track offset to yield a first value;
    reading the second track at a second adjusted track offset to yield a second value, wherein the first adjusted track offset extends closer to the first track than the second adjusted track offset;
    comparing the first value to a first threshold value to yield a first comparison value, wherein the first comparison value indicates that the interference from the first data set written to the first track is not insubstantial; and
    comparing the second value to the first threshold value to yield a second comparison value, wherein the second comparison value indicates that the interference from the first data set written to the first track is insubstantial;
  determining the second estimated track offset where interference from the data written to the third track is insubstantial includes:
    reading the second track at a third adjusted track offset to yield a third value;
    reading the second track at a fourth adjusted track offset to yield a fourth value, wherein the third adjusted track offset extends closer to the third track than the fourth adjusted track offset;
    comparing the third value to a second threshold value to yield a third comparison value, wherein the third comparison value indicates that the interference from the third data set written to the third track is not insubstantial; and
    comparing the fourth value to the second threshold value to yield a fourth comparison value, wherein the fourth comparison value indicates that the interference from the third data set written to the third track is insubstantial.

9. The data storage device of claim 8, wherein the first estimated track offset is the second adjusted track offset, and wherein the second estimated track offset is the fourth adjusted track offset.

10. The data storage device of claim 6, wherein:
  determining the estimated track offset where interference from the first data set written to the first track is insubstantial includes:
    comparing a first value read from the second track to a first threshold value to yield a first comparison value; and
    indicating the interference from the first data set written to the first track is insubstantial based on the first comparison value;
  determining the estimated track offset where interference from the third data set written to the third track is insubstantial includes:
    comparing a second value read from the second track to a second threshold value to yield a second comparison value; and
    indicating the interference from the third data set written to the third track is insubstantial based on the second comparison value.

11. The data storage device of claim 10, wherein the first threshold value and the second threshold value are the same.

12. The data storage device of claim 10, wherein the track width setting circuit is implemented as an integrated circuit.

13. A read head characterization circuit, the circuit comprising:
  a track width setting circuit operable to:
    write a first data set to at least a first track and a second data set to at least a second track on the storage medium via a read/write head assembly, wherein the first track is a first track width and the second track is a second track width, and wherein the first data set is an inverse of the second data set;
    read data from the second track;
    determine an estimated track offset where interference from the first data set written to the first track is insubstantial; and
    modify at least the second track width based at least in part on the estimated track offset.

14. The circuit of claim 13, wherein the circuit is implemented as part of a head characterization test stand.

15. The circuit of claim 13, wherein the circuit is implemented as an integrated circuit.

16. The circuit of claim 13, wherein determining the estimated track offset where interference from the data written to the first track is insubstantial includes:
  comparing a value read from the second track to a threshold value to yield a comparison value; and
  indicating the interference from the first data set written to the first track is insubstantial based on the comparison value.

17. The circuit of claim 13, wherein determining the estimated track offset where interference from the first data set written to the first track is insubstantial includes:
  reading the second track at a first adjusted track offset to yield a first value;
  reading the second track at a second adjusted track offset to yield a second value, wherein the first adjusted track offset is closer to the first track than the second adjusted track offset;
  comparing the first value to a threshold value to yield a first comparison value, wherein the first comparison value indicates that the interference from the first data set written to the first track is not insubstantial;
  comparing the second value to the threshold value to yield a second comparison value, wherein the second comparison value indicates that the interference from the first data set written to the first track is insubstantial; and
  wherein the estimated track offset is the second adjusted track offset.

18. The circuit of claim 13, wherein the estimated track offset is a first estimated track offset, wherein the track width setting circuit is further operable to:
- write a third data set to a third track on the storage medium, wherein the third track is adjacent the second track and separated from the first track by the second track;
- determine a second estimated track offset where interference from the third data set written to the third track is insubstantial; and
- modify at least the second track width based at least in part on a distance between the first estimated track offset and the second estimated track offset.

19. The circuit of claim 18, wherein the track width setting circuit is further operable to:
- calculate the distance between the first estimated track offset and the second estimated track offset.

20. A method for determining a track width corresponding to a read sensor, the method comprising:
- writing a first data set to at least a first track, and a second data set to at least a second track on a storage medium, wherein the second track exhibits a track width, and wherein the first data set is an inverse of the second data set;
- reading data from the second track;
- determining an estimated track offset where interference from the first data set written to the first track is insubstantial;
- determining a second estimated track offset where interference from the data written to the third track is insubstantial;
- calculating a distance between the first estimated track offset and the second estimated track offset; and
- modifying the track width based at least in part on the estimated track offset.

* * * * *